United States Patent [19]

Konzmann et al.

[11] Patent Number: 4,886,317
[45] Date of Patent: Dec. 12, 1989

[54] MOTOR VEHICLE SEAT ARM REST CONTROL

[75] Inventors: Rainer Konzmann; Otto Ohlhausen; Joachim Schmitt; Antonin Koucky, all of Sindelfingen; Josef Klink, Nagold, all of Fed. Rep. of Germany

[73] Assignee: Daimler-Benz Aktiengesellschaft, Stuttgart, Fed. Rep. of Germany

[21] Appl. No.: 256,316

[22] Filed: Oct. 11, 1988

[30] Foreign Application Priority Data

Oct. 8, 1987 [DE] Fed. Rep. of Germany ....... 3734046

[51] Int. Cl.$^4$ .............................................. A47C 7/54
[52] U.S. Cl. .................................... 297/417; 297/115
[58] Field of Search ................. 299/417, 411, 191, 146

[56] References Cited

U.S. PATENT DOCUMENTS

| 2,085,836 | 7/1937 | Tatum | 297/417 X |
| 4,097,088 | 6/1978 | Meiller | 297/417 |
| 4,244,613 | 1/1981 | Hall et al. | 297/417 |
| 4,311,338 | 1/1982 | Moorhouse | 297/417 X |
| 4,400,033 | 8/1983 | Pietsch | 297/417 |
| 4,630,862 | 12/1986 | Watanabe | 297/191 X |

FOREIGN PATENT DOCUMENTS 2648951 5/1978 Fed. Rep. of Germany .

Primary Examiner—Kenneth J. Dorner
Assistant Examiner—José V. Chen

[57] ABSTRACT

In a motor car seat with a variable-angle backrest and having an arm support retained on the frame of the backrest which is foldable down from an essentially vertical erect non-use position in line with the backrest into a lower substantially horizontal use position. While in the use position of the arm support, the backrest maintains its alignment at least during the changing of the backrest during normal driver seat back inclination adjustment, in order to prevent the arm support from striking operating parts of the vehicle; and wherein, when the backrest is folded forwards such as to allow a passenger to exit from a rear seat, the arm support is guided to maintain its position substantially horizontal and above the shift lever arranged on the central console.

2 Claims, 2 Drawing Sheets

MOTOR VEHICLE SEAT ARM REST CONTROL

BACKGROUND AND SUMMARY OF THE INVENTION

The invention relates to a motor car seat having a variable-angle seat backrest and an arm support retained on the frame of the seat backrest and foldable down from an essentially vertical erect non-use position paralleling the seat backrest into a lower substantially horizontal use position. In the use position of the arm support, the arm support is caused to maintain its alignment at least approximately during the changing of the inclination of the seat backrest.

An arm support with parallelogram articulation arrangement associated with a vehicle seat is known from German Published Examined Patent Application DE 2 648 951, and produces the advantage that the alignment of the arm support scarcely changes with respect to the seat backrest within the pivoting range of the backrest, and the same conditions therefore exist at all times. However, this parallelogram arrangement limits the pivoting range to a comparatively small range.

The object of the invention is to ensure a constant as possible alignment of the arm support even through a wide pivoting range, so that contact of the arm support with operating vehicle control parts during the pivoting forward of the backrest is reliably avoided.

This object is obtained by having a linkage which maintains the angularity of the arm support even when the backrest is released to pivot forwardly.

In a preferred exemplary embodiment of the invention, the control device comprises a first rod guided at one end in a slot of a fixed mounting part, while its other end is attached articulatingly to a deviating member pivotably mounted on a second mounting part, which second mounting part is foldable forwards after the releasing of a catch. The control further includes a second rod articulatingly mounted to and leading away from the deviating member to engage the free end of a lever connected firmly to the pivot axis mechanism of the arm support.

Embodiments utilizing flexible transmission elements may also be used instead of this control device, in which case servo-actuated final control members cooperate with the backrest unlocking means to replace a mechanical positive coupling.

Any luggage items which are present in the movement path of the arm support when the backrest is folded forward, do not cause a destruction of the control device because of an overload safety device defined by a spring arranged in the run of the second rod to keep the second rod from pivoting the arm rest, and which spring reacts to intense pressure loading.

Other objects, advantages and novel features of the present invention will become apparent from the following detailed description of the invention when considered in conjunction with the accompanying drawings.

DETAILED DESCRIPTION OF THE DRAWINGS

Figure 1:
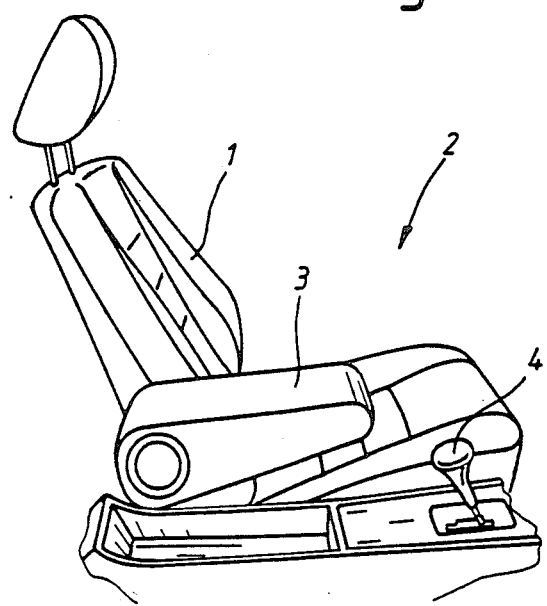
FIG. 1 shows an arm support associated with a driver seat in the use position and with the backrest folded backwards.
Figure 2:
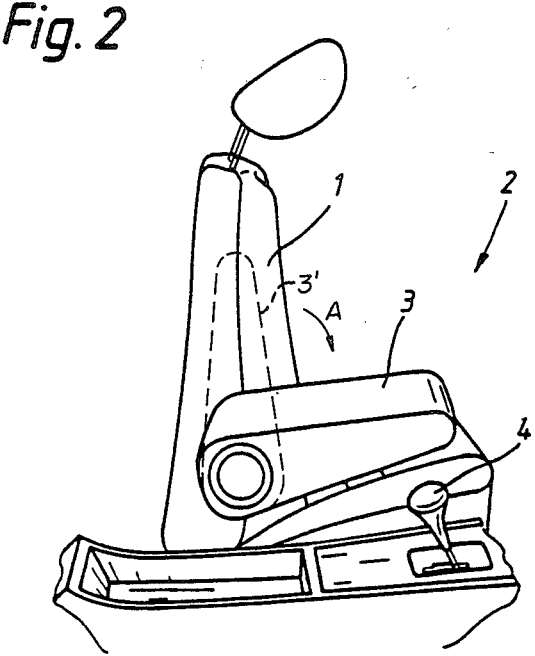
FIG. 2 shows the arrangement according to FIG. 1 with the backrest folded forwards.

As FIGS. 1 and 2 show, the backrest 1 of a vehicle driver seat 2 in a two-doored motor car (not shown) is associated with an arm support 3 which is transferable from a vertically erect non-use position 3' (as indicated by arrow A) where it parallels the backrest of the driver's seat to a lower substantially horizontal use position as shown in FIG. 1. For convenient access to and exit from the rear seats, the backrest 1 can be pivoted forward into the partially folded position as shown in FIG. 2. During this movement, the underside of the arm support 3 is guided past the shift lever 4 and other adjusting members arranged on the seat console.

Figure 3:
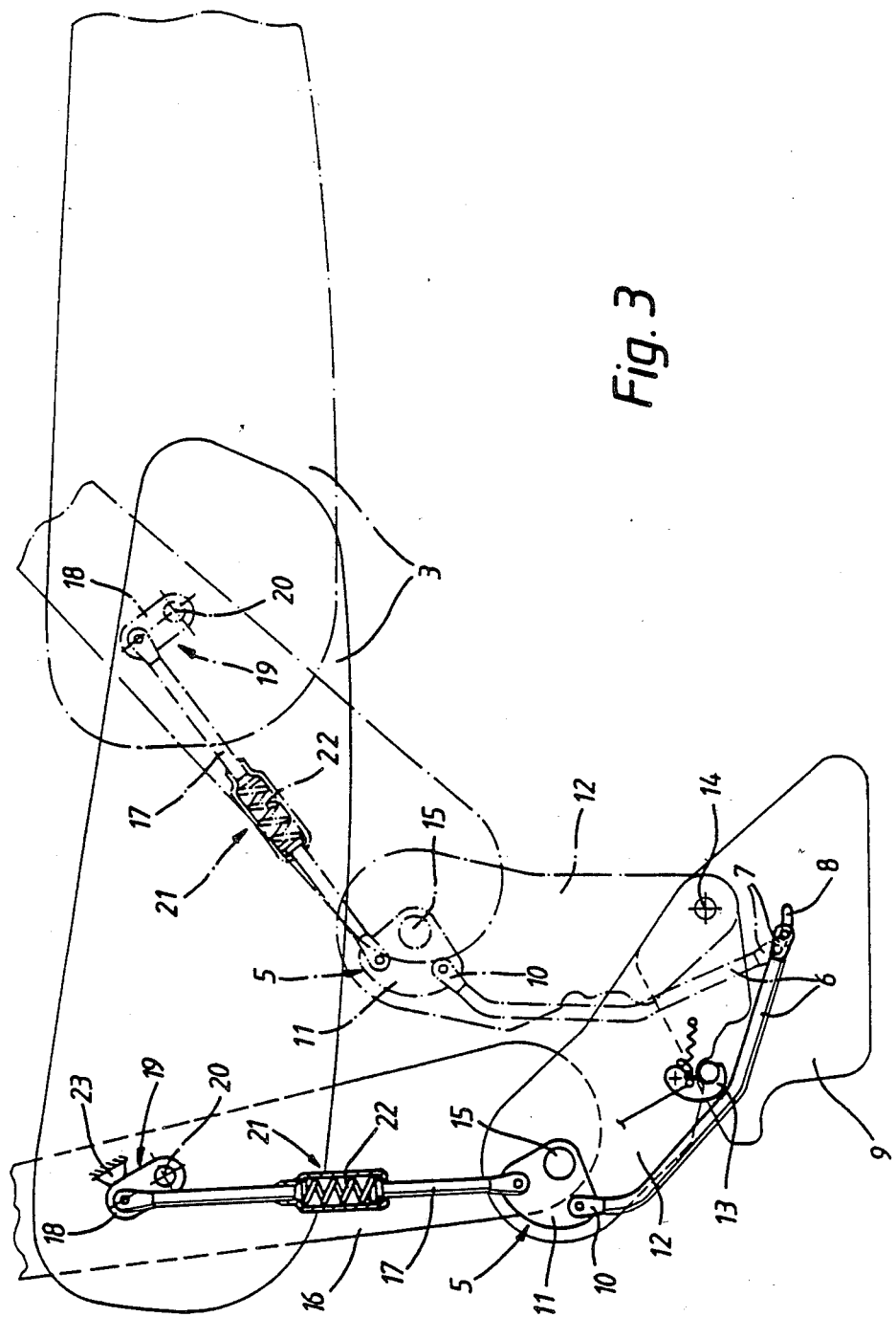
FIG. 3 shows a control device for monitoring the arm support between the two extreme positions of FIGS. 1 and 2.

The control device 5 for moving the arm support (FIG. 3) comprises a first rod 6, one end 7 of which is guided in a slot 8 provided in a fixed mounting part 9. The other end 10 of the rod 6 is pivoted to a deviating member 11, which in turn is pivotably mounted about a pivot 15 on second mounting part 12. The second mounting part 12 is pivotable forward about pivot mechanism 14 after actuation of the remotely actuated release of a spring-loaded catch 13. The pivot mounting 15 of the deviating member 11 simultaneously accommodates a pivoting of the frame 16 of the backrest 1.

A second rod 17 is articulatingly linked to the deviating member 11 and is guided to the free end 18 of a lever 19 mounted on the frame 16. This lever 19 is connected integrally for rotating pivot 20 on the arm support 3. Rotation of the pivot 20 by arm 19, causes pivoting of the arm 3. An overload safety device 21, the spring 22 of which becomes compressed with shortening of the effective length of the rod 17, when an intense pressure loading influences the latter, is arranged within the rod 17.

The inclination of the backrest is variably adjusted within customary limits to aid driver comfort. During this variable adjustment, the lower end 7 of rod 6 is displaced in the slot 8 without reacting on pivot 20 to change the inclination of the arm support 3. This occurs because the arm support 3, in its horizontal selected use position, is secured against folding downward by a stop 23 cooperating with the lever 19 to limit clockwise rotation of pivot 20. Thus, movement of frame 16 holds stop 23 against lever 19, and as frame 16 pivots about pivot 15, diverting member 11 also pivots about 15 moving connection 10 to rod 6 so that its free end 7 rides in track 8.

When the catch 13 is released by pivoting, the backrest 1 and frame 16 can be pivoted forwards into the position indicated by chain-dotted lines about pivot 14 via second mounting part 12. This is due to the second pivoting part 12 being released to move forward. During this movement, the end 7 of the rod 6 is at first displaced in the slot 8 until it comes into abutment at an end of the slot. The deviating member 11 is thereupon pivoted, and an entrainment of the arm support 3 counter to the pivoting direction of the frame 16 occurs through the rod 17 and the lever 19. The transmission ratio here is chosen so that the arm support 3 maintains its alignment while keeping its vertical position and is thereby guided above the shift lever 4 visible in FIGS. 1 and 2. This also excludes the possibility of contact occurring with lower placed final control elements such as switches.

When the backrest, and therefore the frame 16, is pivoted backwards again, a reversal of the described movement occurs and when the initial position is reached the catch 13 re-engages automatically and the mounting parts 9 and 12 become locked together.

The adjusting movement of the arm support which commences during the folding operation of the backrest may also, in manner not shown, occur through a separate motor-driven lift mechanism, controlled by limit switches for example.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Motor car seat having a variable-angle backrest and an arm support retained on a frame of said backrest; said arm support being foldable clockwise from a vertical erect non-use position into a horizontal lower use position; and wherein, while in the use position, an arm support control means essentially maintains the angular alignment of said arm support during the changing of the backrest inclination; wherein the arm support control means also guides the arm support above a shift lever arranged on a central console of the seat during the time the backrest is foldable forward;

wherein the arm support control means includes a first rod guided adjacent one end in a slot of a fixed mounting part and adjacent another end, the first rod is pivotably attached to a deviating member pivotably mounted on a second mounting part; said second mounting part being pivotally attached to said fixed mounting part and foldable forwards after release by a catch means which secures the mounting part against folding; and wherein a second rod is pivotably attached to the deviating member and to a lever pivotally connected between the arm support and the frame to maintain said alignment of the arm support and for the guiding of the arm support above the shift lever.

2. Motor car seat according to claim 1, wherein an overload safety means is provided by a spring which can react to intense pressure loading on the second rod; and wherein the spring is arranged internally of the second rod.

* * * * *